United States Patent
Motoyama et al.

(10) Patent No.: US 7,152,095 B1
(45) Date of Patent: Dec. 19, 2006

(54) METHOD AND APPARATUS FOR ERASING DATA AFTER TAMPERING

(75) Inventors: Tetsuro Motoyama, Cupertino, CA (US); Masuyoshi Yachida, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 88 days.

(21) Appl. No.: 11/092,148

(22) Filed: Mar. 28, 2005

Related U.S. Application Data

(63) Continuation of application No. 09/947,164, filed on Sep. 4, 2001, now Pat. No. 6,874,092, which is a continuation of application No. 09/167,184, filed on Oct. 6, 1998, now Pat. No. 6,301,670.

(51) Int. Cl.
*G06F 15/167* (2006.01)

(52) U.S. Cl. .................. 709/212; 709/220; 709/229; 711/162

(58) Field of Classification Search ............. 709/212, 709/220, 229; 707/205; 711/161, 162
See application file for complete search history.

(56) References Cited

U.S. PATENT DOCUMENTS

| | | | |
|---|---|---|---|
| 4,426,680 A | 1/1984 | Tague et al. | |
| 4,451,742 A | 5/1984 | Aswell | |
| 4,584,641 A | 4/1986 | Guglielmino | |
| 4,639,864 A | 1/1987 | Katzman et al. | |
| 5,007,053 A | 4/1991 | Iyer et al. | |
| 5,130,922 A | 7/1992 | Liu | |
| 5,265,159 A | 11/1993 | Kung | |
| 5,313,632 A | 5/1994 | Sekizawa et al. | |
| 5,325,523 A | 6/1994 | Beglin et al. | |
| 5,359,713 A | 10/1994 | Moran et al. | |
| 5,375,227 A | 12/1994 | Akatsu et al. | |
| 5,388,156 A | 2/1995 | Blackledge, Jr. et al. | |
| 5,414,827 A | 5/1995 | Lin | |
| 5,428,766 A | 6/1995 | Seaman | |
| 5,438,674 A | 8/1995 | Keele et al. | |
| 5,448,719 A | 9/1995 | Schult et al. | |
| 5,457,748 A | 10/1995 | Bergum et al. | |
| 5,469,573 A | 11/1995 | McGill, III et al. | |
| 5,475,834 A | 12/1995 | Anglin et al. | |
| 5,499,012 A | 3/1996 | Tracy et al. | |
| 5,515,540 A | 5/1996 | Grider et al. | |
| 5,544,356 A | 8/1996 | Robinson et al. | |
| 5,630,044 A * | 5/1997 | Suzuki ................ 714/5 | |

(Continued)

FOREIGN PATENT DOCUMENTS

DE 41 35 767 A A1 5/1993

(Continued)

OTHER PUBLICATIONS

IBM Corp., "Encryption Key Security by Electric Field Destruction of Memory Cells," IBM Technical Disclosure Bulletin, vol. 31, No. 8, Jan. 1989, 7 pages.

*Primary Examiner*—Frantz B. Jean
(74) *Attorney, Agent, or Firm*—Hickman Palermo Truong & Becker LLP; Edward A. Becker

(57) ABSTRACT

An approach for storing and maintaining data is disclosed. One or more sensors are provided for detecting unauthorized access to a first non-volatile storage. If unauthorized access to the first non-volatile storage is detected, then the data on the first non-volatile storage is deleted by overwriting the data on the first non-volatile storage with a predetermined value so that the data cannot be recovered. The first non-volatile storage is registered with a registration authority to provide authentication of the data maintained on the first non-volatile storage.

18 Claims, 11 Drawing Sheets

U.S. PATENT DOCUMENTS

| | | | |
|---|---|---|---|
| 5,638,509 A | | 6/1997 | Dunphy et al. |
| 5,664,089 A | | 9/1997 | Byers et al. |
| 5,682,471 A | | 10/1997 | Billings et al. |
| 5,761,705 A | | 6/1998 | DeKoning et al. |
| 5,787,247 A | | 7/1998 | Norin et al. |
| 5,794,253 A | * | 8/1998 | Norin et al. ............... 707/203 |
| 5,835,953 A | | 11/1998 | Ohran |
| 5,913,025 A | | 6/1999 | Higley et al. |
| 5,943,688 A | | 8/1999 | Fisher et al. |
| 5,991,895 A | | 11/1999 | Laudon et al. |
| 6,006,311 A | | 12/1999 | Arimilli et al. |
| 6,009,500 A | * | 12/1999 | Rossi ........................ 711/162 |
| 6,035,379 A | * | 3/2000 | Raju et al. ................. 711/162 |
| 6,088,815 A | | 7/2000 | West et al. |
| 6,092,173 A | * | 7/2000 | Sasaki et al. ................ 712/14 |
| 6,119,209 A | * | 9/2000 | Bauman et al. ............. 711/162 |
| 6,138,125 A | | 10/2000 | DeMoss |
| 6,185,507 B1 | | 2/2001 | Huber et al. |
| 6,301,670 B1 | | 10/2001 | Motoyama et al. |
| 6,304,948 B1 | | 10/2001 | Motoyama et al. |

FOREIGN PATENT DOCUMENTS

| | | |
|---|---|---|
| JP | 358012055 A | 1/1983 |
| JP | 361240351 A | 10/1986 |
| JP | 404205492 A | 7/1992 |
| JP | 9330272 A | 12/1997 |
| JP | 100 271 05 A | 1/1998 |
| SE | 8003932 | 1/1982 |
| WO | WO 97/30447 A1 | 8/1997 |

\* cited by examiner

Registered identifier value 420

| Header segment 422 | Device maker segment 424 | Serial number segment 426 |

Table 460

| Manufacturer | Serial Number | Assigned Date | |
|---|---|---|---|
| | | | |
| | | | |
| | | | |

462 →

464   466   468

METHOD AND APPARATUS FOR ERASING DATA AFTER TAMPERING

RELATED APPLICATIONS AND CLAIM OF PRIORITY

This application is a continuation of and claims priority to U.S. patent application Ser. No. 09/947,164, filed on Sep. 4, 2001, now issued as U.S. Pat. No. 6,874,092, entitled "Method and Apparatus For Erasing Data After Tampering", which is a continuation of U.S. patent application Ser. No. 09/167,184, filed on Oct. 6, 1998, issued as U.S. Pat. No. 6,301,670, entitled "Method and Apparatus for Erasing Data When a Problem is Identified", the contents both of which are incorporated herein by reference in their entirety for all purposes.

This application is related to U.S. patent application Ser. No. 10/884,109, filed on Jul. 1, 2004, entitled "Method and System to Erase Data After Expiration or Other Condition".

This application is also related to U.S. patent application Ser. No. 09/167,628, filed on Oct. 6, 1998, issued as U.S. Pat. No. 6,304,948, entitled "Method and Apparatus For Erasing Data After Expiration".

FIELD OF THE INVENTION

The invention relates to data storage systems, and more specifically, to an approach for storing and maintaining data that ensures file integrity and security.

BACKGROUND OF THE INVENTION

Most computer systems include some type of non-volatile storage to store and maintain data. Non-volatile storage provides a storage medium whose contents are retained if power is removed. Common examples of non-volatile storage include floppy disks, hard disks and tapes.

Most types of non-volatile storage offer relatively high reliability, particularly when redundant storage is used. The performance of non-volatile storage varies widely between different types of non-volatile storage. For example, hard disks traditionally offer higher performance, in terms of access speeds, than floppy disks or tapes. Most types of non-volatile storage can be re-used, since the process used to store data is non-destructive. When data in the form of a data file is deleted, often directory information associated with the data file is merely updated in the non-volatile storage, and the data file itself is unchanged. For example, on many computer systems, deleting a data file is accomplished by removing the filename from a file directory or file allocation table that makes the locations occupied by the data file available for other data. However, the data file still resides on the non-volatile storage and can be recovered so long as it is not overwritten with other data. This approach makes it difficult to know whether a particular copy of data is an original copy and makes the data susceptible to being obtained by a third party.

Another type of non-volatile storage allows data to be written only once, but read as many times as desired. This type of non-volatile storage is usually referred to as a write once, read many (WORM) storage medium. A common example of a WORM non-volatile storage device is an optical disk. This type of storage medium is useful for archiving data, for example certain types of medical and business records, that are written only once and may be read several times. This guarantees that a particular copy of data is an original copy since the data cannot be updated or overwritten.

Both WORM systems and conventional read/write storage systems suffer from the disadvantage that they are vulnerable to modification of data. A user of data is not sure if the data is original or modified by the unknown sources when using the data. For example, in a disk storage subsystem, an unauthorized individual may remove the disk drive and alter, intercept, or copy the information stored on the disk drive.

In addition, information stored in storage systems can become undesirable to be stored after the passage of sufficient time. Therefore, in some contexts it is desirable to provide a way for old information to expire from a storage system and become unavailable. One such example is a company record that should be destroyed after five years according to the company policy.

Based on the need to securely store and maintain data and the limitations in the prior approaches, an approach for storing and maintaining data that provides a relatively high assurance that a particular copy of data is an original copy is highly desirable.

SUMMARY OF THE INVENTION

According to one aspect of the invention, a method is provided for storing data on a storage unit in a manner that allows modification of the data only if a tamper signal is detected that indicates unauthorized physical access to the storage unit. The method includes detecting the tamper signal and in response to detecting the tamper signal, deleting the data stored on the storage unit by overwriting the data with a specified value, and preventing any data from being written to the storage unit and preventing any data from being read from the storage unit.

According to another aspect of the invention, a data storage unit for storing and maintaining data is provided. The data storage unit comprises a first non-volatile storage device and a processing unit communicatively coupled to the first non-volatile storage device. The processing unit is configured to allow modification of the data stored on the first non-volatile storage device only if a tamper signal is detected that indicates unauthorized physical access to the first non-volatile storage device. The processing unit is also configured to in response to detecting the tamper signal, delete the data stored on the first non-volatile storage device by overwriting the data stored on the first non-volatile storage device with a specified value, and prevent any data from being written to the first non-volatile storage device and prevent any data from being read from the first non-volatile storage device.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

An approach for storing, maintaining and accessing data is provided. In general, in one aspect, data is stored on a storage unit and erased after a predetermined time. In another aspect, the data is erased if unauthorized tampering of the storage unit occurs. In yet another aspect, the data is erased in the event of a failure of non-volatile storage in the storage unit. Another approach involves a hardware storage unit where the data can be stored permanently and can be authenticated. The approach is to create the device that has its own operating system with a secure hardware and software interface. The interface ensures that the modification of the data is not allowed. The present invention can be used on such a device where the authenticity of the data is critical. These aspects are described in more detail hereinafter.

System Overview

Figure 1:
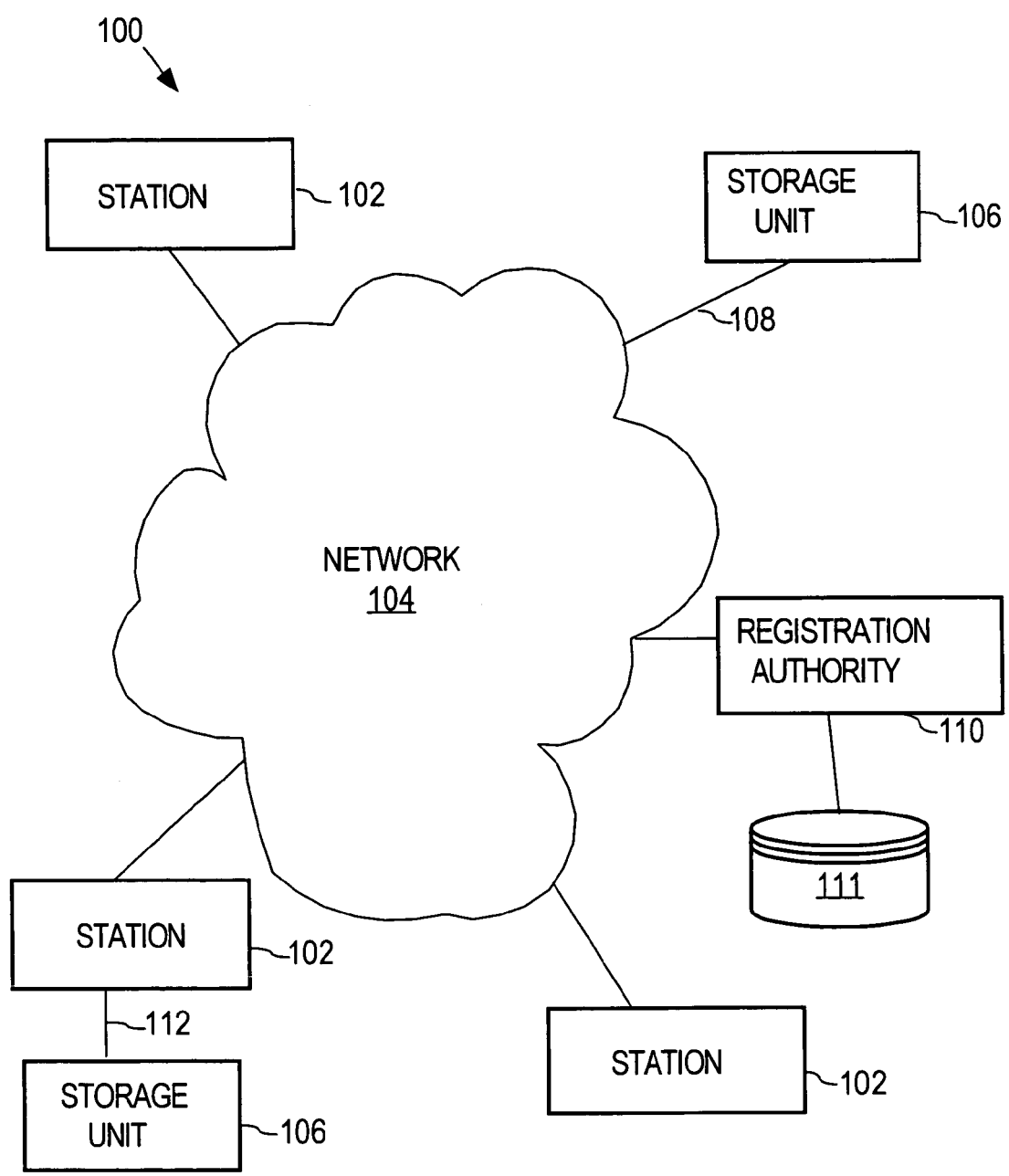
FIG. 1 is a block diagram illustrating a system for storing and maintaining data.

FIG. 1 illustrates a system 100 for storing data. One or more stations 102 are coupled via a network 104. Stations 102 each comprise a computer, a workstation, or other similar processing mechanism. For example, in one embodiment each station 102 is a general purpose computer system of the kind shown in FIG. 6 and described further below. Stations 102 may each represent a client in a client/server environment. Using the network 104, one station 102 may communicate with any other station.

One or more storage units 106 are provided for storing and maintaining data. Storage units 106 may be connected to network 104 via link 108 to operate with other devices such as stations 102 connected to network 104. Link 108 may be any type of communication medium for exchanging data between storage units 106 and other devices. Examples of links 108 include network connections, Ethernet, LAN or WAN connections, or any type of wireless transmission medium. Alternatively, storage units 106 may also be connected directly to a particular station 102 using a local link 112. Storage units 106 may also be used in other configurations, for example, connected directly to a particular number of stations 102 to provide local storage to the particular stations 102. Links 108 also may comprise an interface from a station to a storage device, such as a SCSI interface.

In this arrangement, each station 102 may store or retrieve information in a storage unit 106 over a link 108 by communicating an appropriate message over network 104.

The system 100 also includes a registration authority 110 that is communicatively coupled to network 104 and provides for the registration of storage units 106 as described in more detail hereinafter.

Storage Units

Figure 2A:
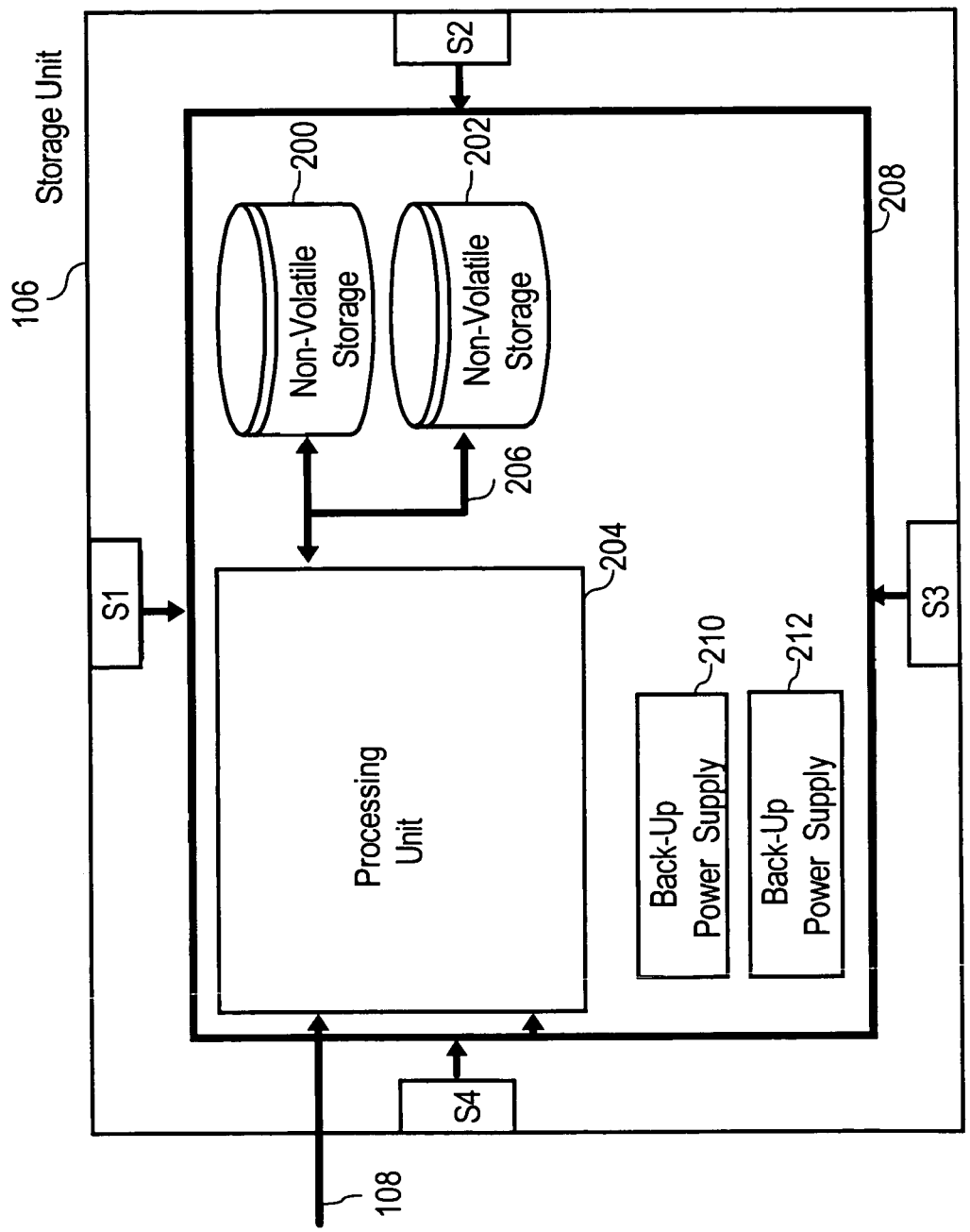
FIG. 2A is a block diagram illustrating a storage unit contained in the system of FIG. 1.
Figure 2B:
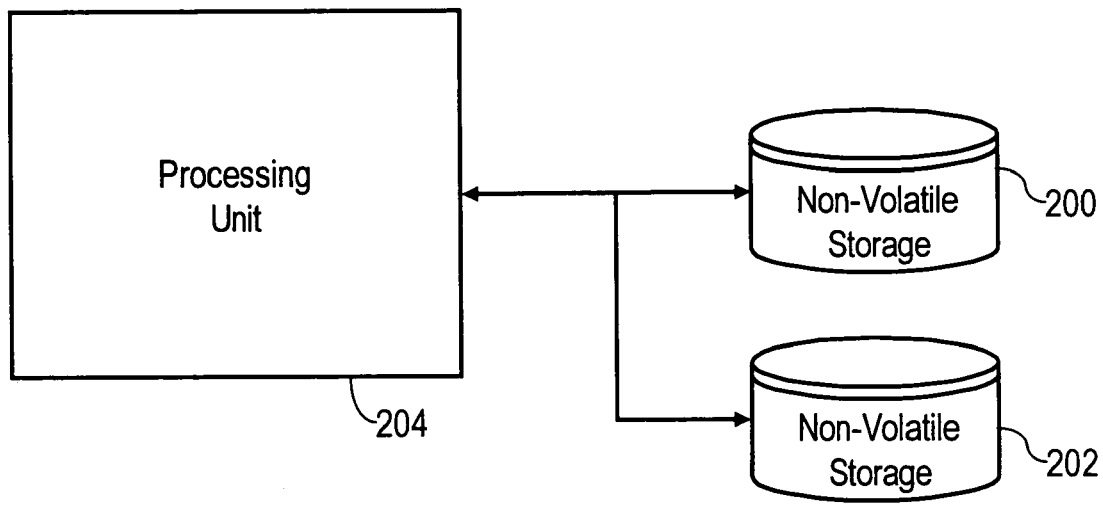
FIG. 2B is a block diagram illustrating a portion of the storage unit of FIG. 2A.
Figure 2C:
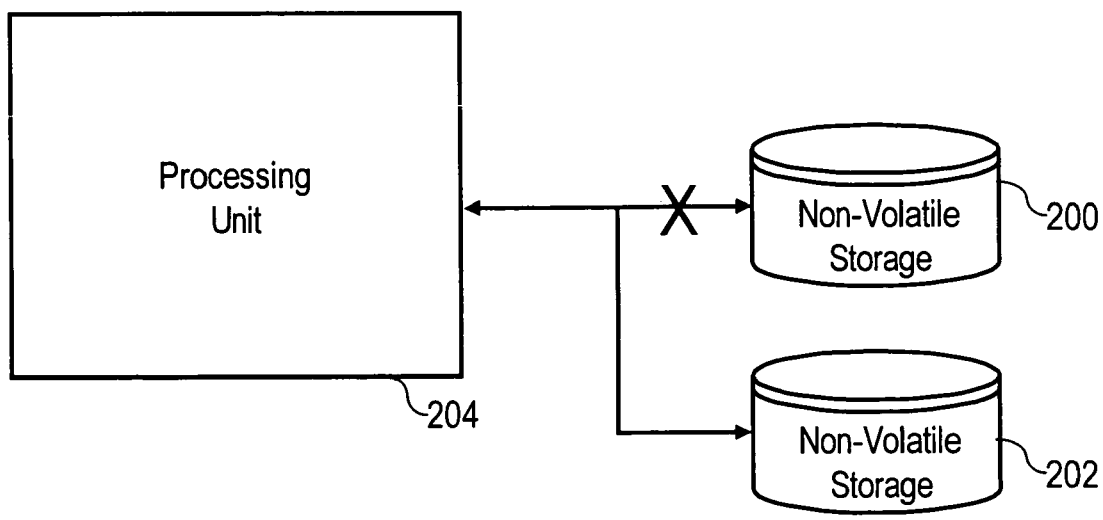
FIG. 2C is a block diagram illustrating a portion of the storage unit of FIG. 2B.

FIG. 2A is a block diagram illustrating a storage unit 106. Storage unit 106 includes one or more non-volatile storage devices 200 and 202. In one embodiment, there are two non-volatile storage devices 200 and 202 that provide redundant storage of data. However, the invention is not limited to a particular number of storage devices 200, 202. As illustrated in FIG. 2B, data is written to both non-volatile storage devices 200 and 202. Thus, as illustrated in FIG. 2C, if one of the non-volatile storage devices 200, 202 is not available, for example due to a failure, the data is written to the other non-volatile storage device 200 or 202. Non-volatile storage devices 200 and 202 may be any type of non-volatile storage, for example, one or more magnetic or optical disks, tapes or other type of non-volatile storage in which stored data is retained if power is removed.

Storage unit 106 includes one or more sensors, identified in FIG. 2 as S1–S4, for sensing unauthorized access to storage unit 106. The sensors S1–S4 are devices that sense an intrusion into the storage unit 106, unauthorized access to the storage unit, or unauthorized tampering with or disabling a storage unit. The sensors S1–S4 are mechanical, electro-mechanical, or electronic devices that generate a signal in response to a sensed event. For example, in an embodiment, each of the sensors S1–S4 is a microswitch that opens or closes when a cover of the storage unit is opened. Each sensor S1–S4 is coupled to a processing unit 204 through a link 208.

Storage unit 106 includes processing unit 204 that controls the flow of data to and from storage unit 106 via link 108, and carries out other processing functions. Processing unit 204 also controls the operation of non-volatile storage devices 200 and 202 including writing data to and reading data from non-volatile storage devices 200 and 202 via a link 206. Processing unit 204 is also communicatively coupled to sensors S1–S4 via a link 208. Links 206 and 208 may be implemented in the same manner as links 108 and provide for the exchange of data between processing unit 204 and non-volatile storage devices 200 and 202 and between processing unit 204 and sensors S1–S4, respectively.

Storage unit 106 also optionally includes backup power supplies 210 and 212 which each provide power to storage unit 106 and its components, including non-volatile storage devices 200 and 202, processing unit 204 and sensors S1–S4. Backup power supplies 210 and 212 are ideally implemented so that either backup power supply 210 or 212 can individually provide sufficient power for storage unit 106 to operate in the event of a power loss. For example, backup power supplies 210 and 212 may be implemented using batteries or an uninterruptible power supply (UPS). Preferably, one of the backup power supplies is an onboard battery that provides backup power to the processing unit 204.

The Processing Unit

Figure 3:
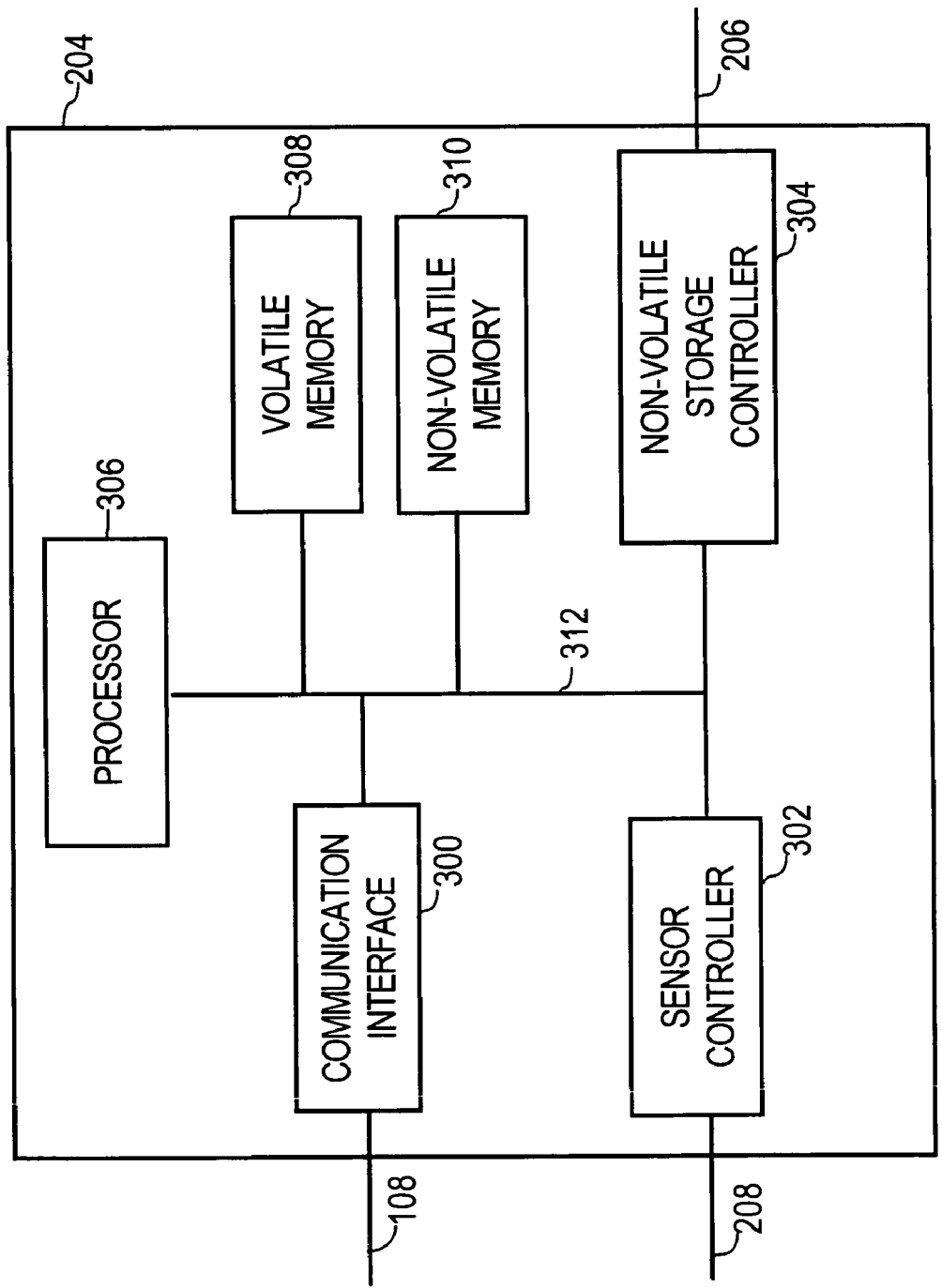
FIG. 3 is a block diagram illustrating a processing unit contained in the storage unit of FIG. 2.

FIG. 3 is a block diagram illustrating a processing unit 204. Processing unit 204 includes a communication interface 300 that controls, buffers and regulates communication between processing unit 204 and other devices external to storage unit 106 via link 108. For example, communication interface 300 may be an I/O controller such as a SCSI, IEEE 1394 or an Ethernet controller. Processing unit 204 includes a sensor controller 302 that interfaces and provides communication between sensors S1–S4 and processing unit 204 via link 208. For example, the sensor controller is an analog I/O interface.

Processing unit 204 also includes a non-volatile storage controller 304 that controls non-volatile storage devices 200 and 202 via link 206. For example, the storage controller 204 is a disk controller. Processing unit 204 also includes a processor 306 that controls the operation of the processing unit 204 and its components described herein. Processor 306 is a microprocessor, for example.

Processing unit 204 includes a volatile memory 308, such as a RAM, that contains data and instructions for processor 306. Processing unit 204 also includes a non-volatile memory 310, such as a ROM, PROM, EPROM, Flash Memory, or other non-volatile memory.

Communication interface 300, sensor controller 302, non-volatile storage controller 304, processor 306, volatile memory 308 and non-volatile memory 310 are communicatively coupled via a link 312 that allows communication between these elements. An example of link 312 is a communication bus or the combination of an address bus and a data bus.

Preferably, the processing unit 204 operates under control of a real-time operating system (OS) such as UNIX. One or more stored programs, operating under control of the OS, manage operation of the storage units and the processes described further herein.

Non-Volatile Storage

Figure 4A:
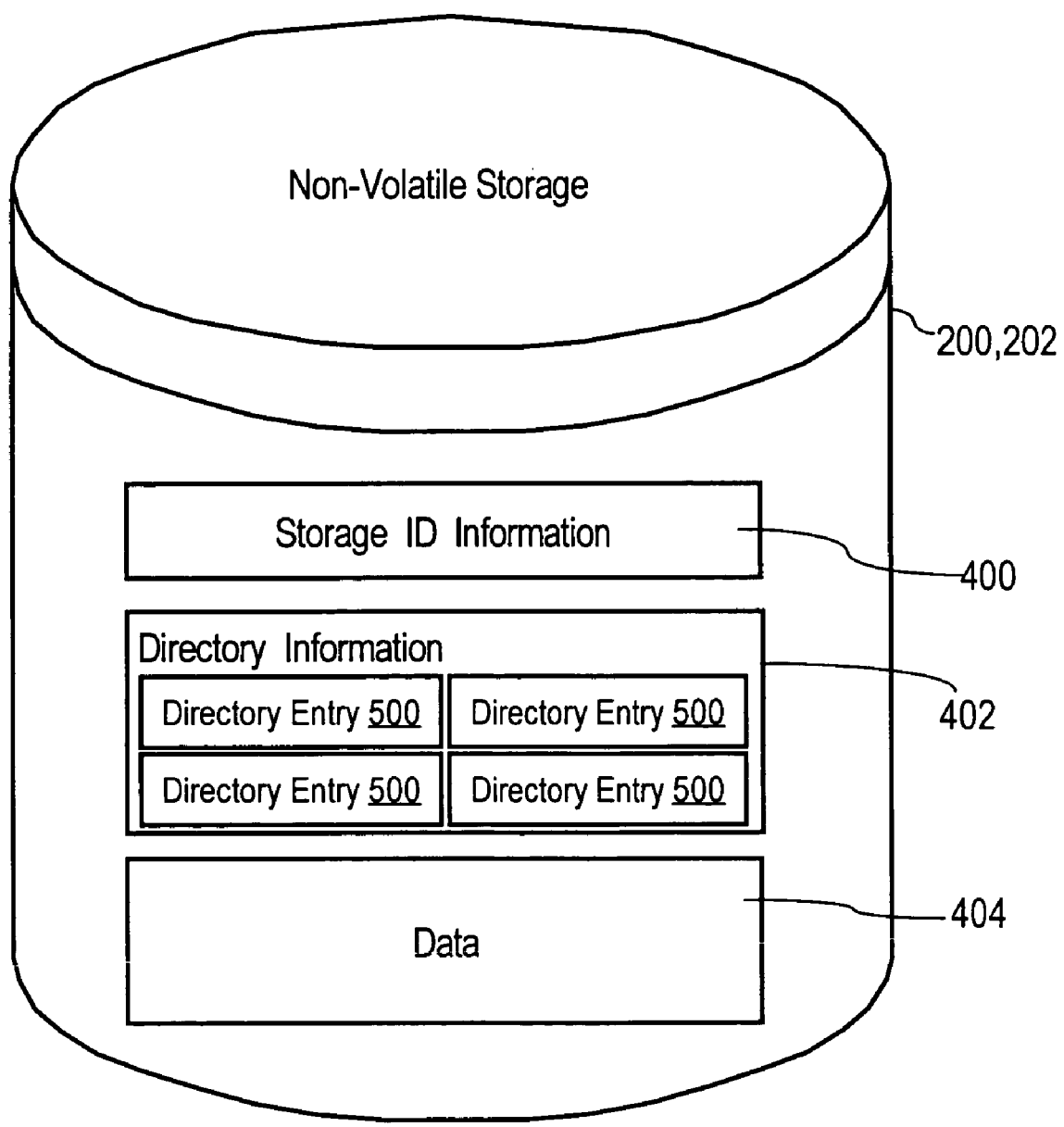
FIG. 4A is a block diagram illustrating the contents of a non-volatile storage device contained in the storage unit of FIG. 2.

FIG. 4A illustrates the contents of non-volatile storage devices 200 and 202. Non-volatile storage devices 200 and 202 each include or store storage ID information 400 that uniquely identifies non-volatile storage devices 200 and 202. For example, storage ID information 400 may include unique serial numbers for non-volatile storage devices 200 and 202. Storage ID information 400 also specifies information obtained during registration of storage unit 106 that is used to authenticate storage unit 106. The registration of storage units is described in more detail hereinafter.

Non-volatile storage devices 200 and 202 also include directory information 402 that specifies information about data 404 contained on non-volatile storage devices 200 and 202. According to one embodiment, data 404 includes a plurality of data files and directory information 402 includes a plurality of directory entries 500 that correspond to and specify information about the data files in data 404. A file-oriented storage system is not required. The data 404 may be stored information of any kind and the directory information 402 may be any metadata that describes the data 404.

Figure 5A:
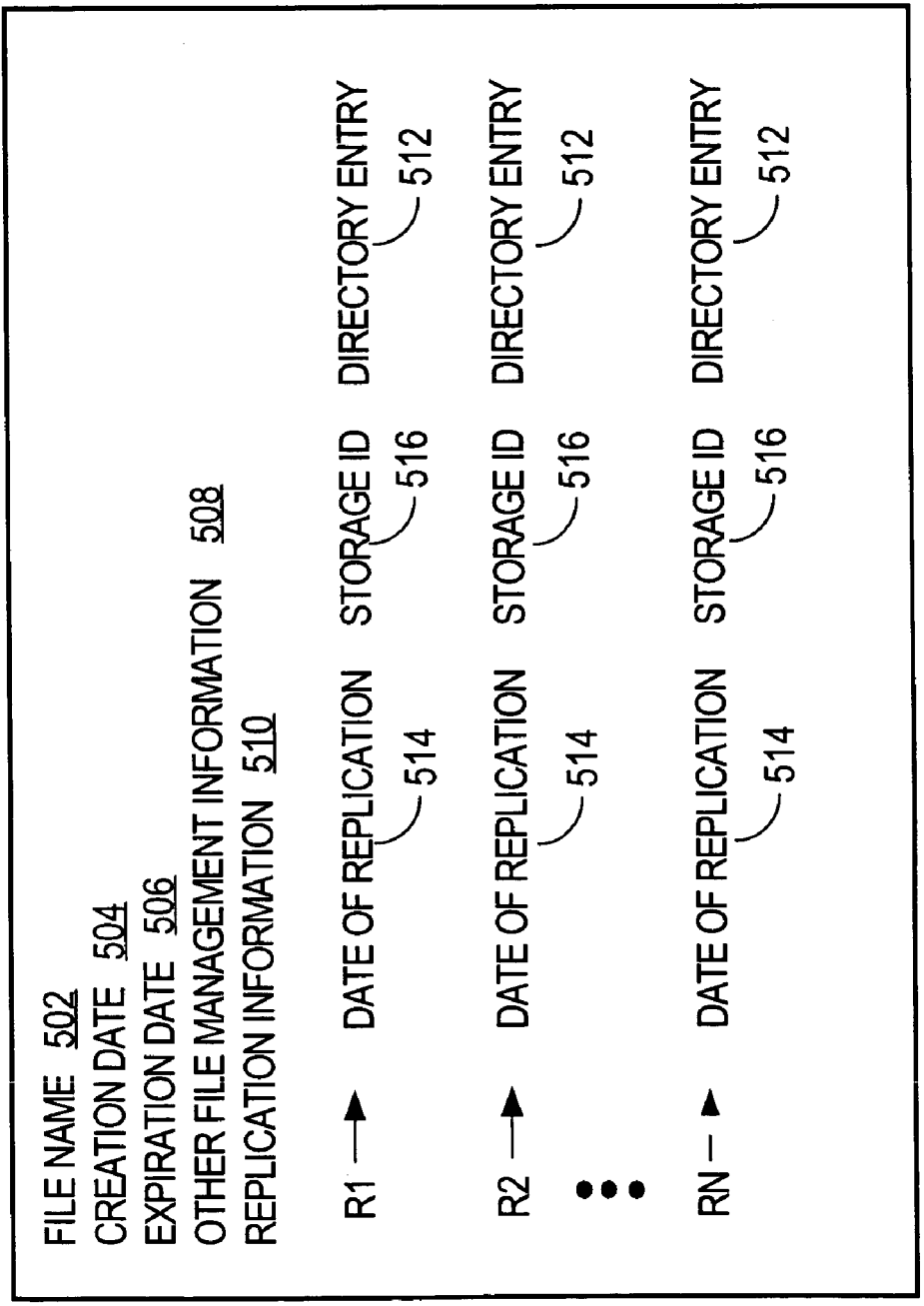
FIG. 5A illustrates the contents a directory entry contained in the non-volatile storage device of FIG. 4A.

FIG. 5A illustrates the contents of a directory entry 500 according to one embodiment. Directory entry 500 specifies the name of the corresponding data file (File Name 502), the creation date of the corresponding data file (Creation Date 504), the expiration date of the corresponding data file (Expiration Date 506) and other file management information 508 that may vary depending upon a particular application. For example, the other file management information is a file type, associated application, etc.

Directory entry 500 also specifies replication information 510 that identifies one or more directory entries 512 (R1, R2 . . . RN) for sources of the data file associated with the file 502. Each file contains the complete history of the parent data with the storage ID information, replication date and directory path on the storage ID. The file name of the data is not changed from the original. The expiration data is also copied.

As used herein, "expiration date" means a time, day or date at which associated data is invalid or unusable. Information in the storage devices is managed by the OS.

Erase After Expiration

According to one embodiment, data stored on non-volatile storage devices 200 and 202 is erased after a specified period of time. This process is data specific, which means that different data may reside on non-volatile storage devices 200 and 202 for different periods of time. Also, different expiration dates may apply to different data. Some data may not be erased at all and may reside on non-volatile storage devices 200 and 202 indefinitely.

Figure 5B:
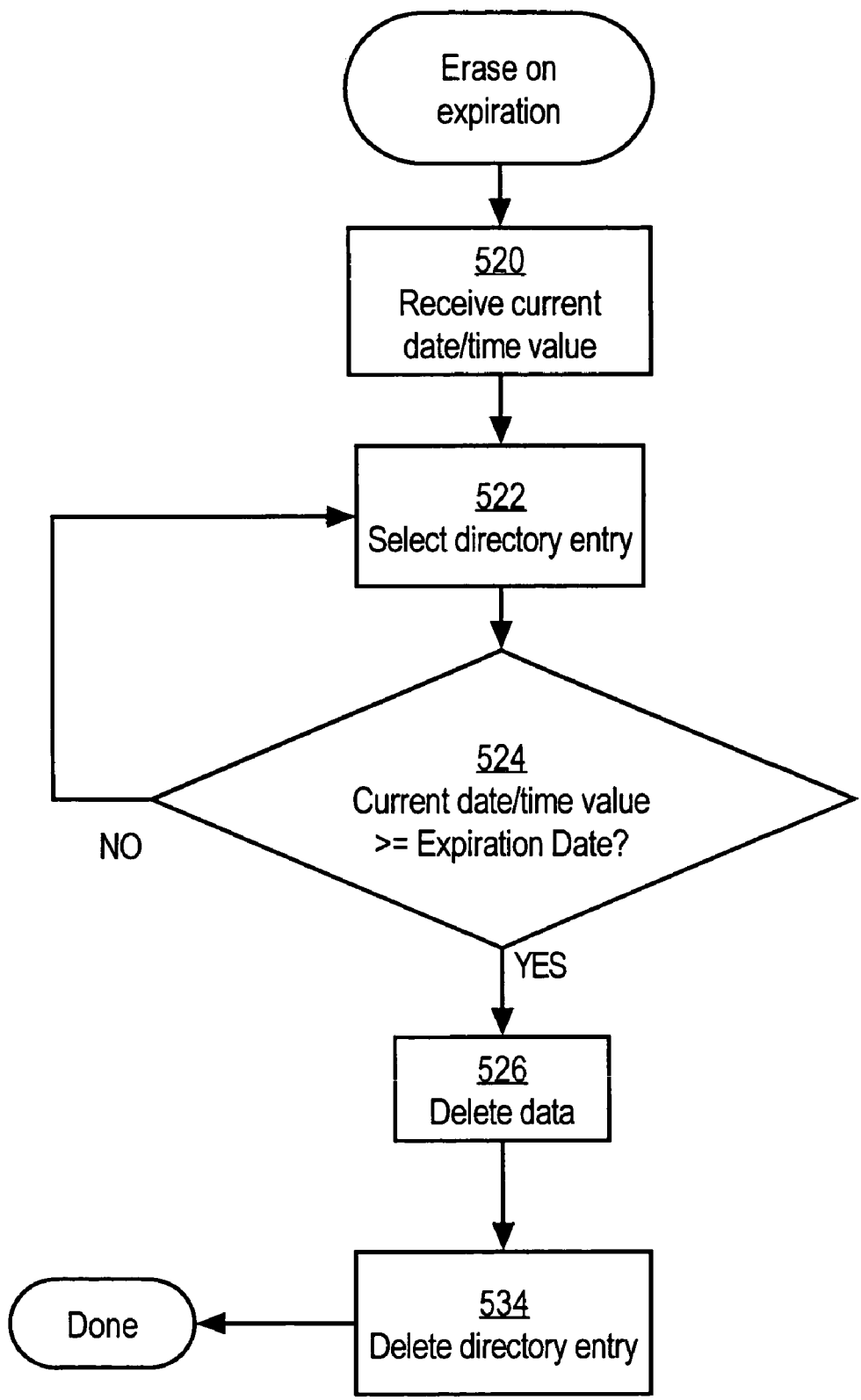
FIG. 5B is a flow diagram of an erase process.

Referring to FIG. 4A, FIG. 5A, and FIG. 5B, directory entries 500 contained in directory information 402 are examined to determine if the Expiration Date 506 has been reached. This is performed by comparing the Expiration Date 506 for a particular directory entry 500 to the current date. Alternatively, instead of maintaining an Expiration Date 506 in each directory entry 500, a "time to keep" may be maintained in each directory entry and the expiration date may be determined from both the creation date and the "time to keep." An alternative approach is to have an agent that visits all the entries of all the directories to check the time and date of the system against expiration date of the entries. If the expiration date is passed, the agent deletes the entries.

FIG. 5B is a flow diagram of a preferred method of erasing data. In block 520, a current date/time value is received. For example, the processing unit 204 requests and receives a date/time value by calling a function of an operating system that controls the operation of the processing unit. Alternatively, the processing unit contains a clock that is directly interrogated by the processor 306. The current date/time value reflects the current day, date, or time of execution of the method shown in FIG. 5B. Preferably, the current date/time value is stored in a temporarily location for later use, such as in a CPU register, a scratchpad memory area, or in main memory.

In block 522, one directory entry 500 is selected for processing. In one embodiment, block 522 involves serial polling of all the directory entries 500 in the storage devices 200, 202. Alternatively, block 522 involves selecting a directory entry based on a heuristic process, such as a least-recently-used (LRU) algorithm, probability, or statistics.

In block 524, a determination is made whether to delete data represented by the current directory entry. In an embodiment, block 524 involves testing whether the current date/time value received in block 520 is greater than or equal to the Expiration Date value 506 stored in the current directory entry. If so, then the current directory entry is to be deleted.

Once a determination is made that particular data is to be deleted, the data associated with the current directory entry is deleted from data 404 as shown by block 526. Otherwise, control passes to block 534. Once the particular data has been deleted, the directory entry 500 is deleted, as shown by block 534. All identical copies of the particular data are also deleted from data 404 since the copies contain the identical expiration date and are also checked.

According to one embodiment, deleting data 404 and the corresponding directory entry 500 from directory information 402 in blocks 526, 530 and 534 is performed by overwriting the data and the directory entry with a predetermined value. An example predetermined value found to be suitable is 00H, although other predetermined values may also be used. Some prior approaches merely delete the directory entry without deleting the data itself, which allows the data to be recovered. Overwriting data with a predetermined value is considered more secure because the overwritten data is more difficult to recover. Once data has been deleted from data 404 and the corresponding directory entry has been deleted from directory information 402, the overwritten areas may be used to store other data.

According to an alternative embodiment, different predetermined values are used to overwrite different data. For example, suppose the Expiration Date for a particular data file residing on non-volatile storage device 200 indicates that the particular data file is to be deleted. A copy of the particular data file is maintained on non-volatile storage device 202. The particular data file on non-volatile storage device 200 may be overwritten with a first predetermined value while the copy of the particular data file on non-volatile storage device 202 is overwritten with a second predetermined value that is different that the first predetermined value. Different predetermined values may also be used to overwrite the corresponding directory entries.

According to one embodiment, the process of FIG. 5B is performed by processing unit 204. Specifically, processor 306 may perform this process by executing one or more instructions maintained in volatile memory 308 and non-volatile memory 310. Alternatively, the process of examining entries in directory information 402 may be performed external to storage unit 106, for example, by another process or station 102 connected to network 104. In this situation, the other process or station 102 may query storage unit 106 via link 108 to obtain directory information 402.

Although storage ID information 400, directory information 402 and data 404 are described and illustrated as being maintained together on non-volatile storage devices 200 and 202, some of this information may be maintained separately in another location. For example, part or all of directory information 402 may be maintained in volatile memory 308 of processing unit 204 reduce the time required to determine if any data files need to be deleted from data 404.

Erase After Non-Volatile Storage Failure

According to another embodiment, in the event of a failure of either of the non-volatile storage devices 200 or 202, all data contained in data 404 and directory entries contained in directory information 402 are deleted as previously described. The other storage device is then designated as the primary storage device and continues to be used. An example situation in which this might occur is where an update is being made to both non-volatile storage devices 200 and 202 and a media failure prevents the update from being made to either non-volatile storage device 200 or 202. Since non-volatile storage devices 200 and 202 provide redundant storage, the data is deleted from the non-volatile storage devices 200 or 202 that failed so that non-volatile storage devices 200 and 202 will not contain different (and presumably valid) data.

Figure 5C:
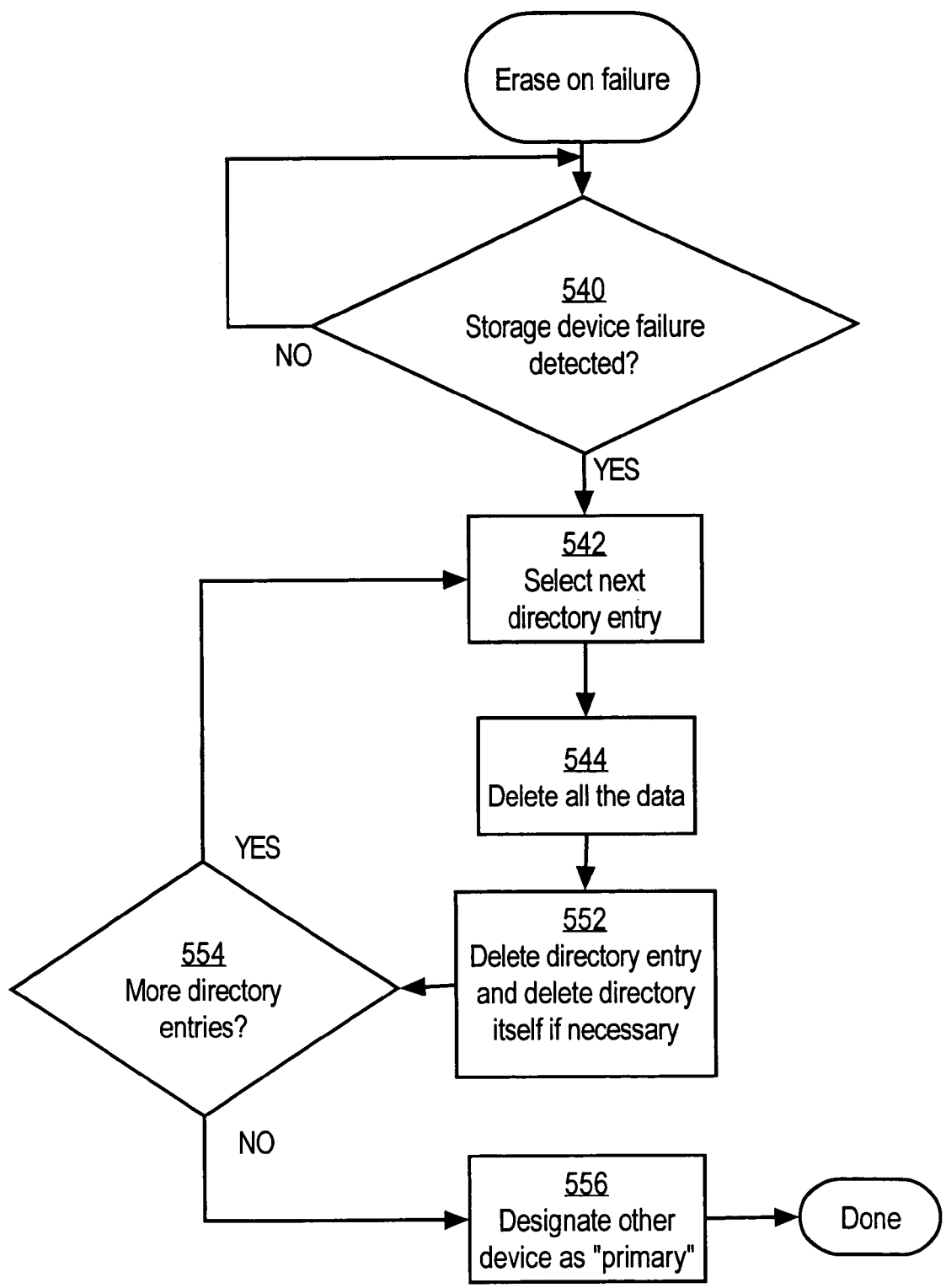
FIG. 5C is a flow diagram of an erase on failure process.

FIG. 5C is a flow diagram of a preferred method of erasing a storage device in the event of a failure. In block 540, a storage device failure is detected. For example, block 540 may involve the steps of detecting, in a power-up routine or bootstrap loader routine, that a power failure or other failure has occurred. In one embodiment, each storage device 200, 202 has a dedicated storage location that stores a marker value. The marker value is a pre-determined value that signifies a graceful shutdown of the storage device. When the storage device is shut down gracefully, the predetermined marker value is stored in the dedicated storage location. When the storage device is started up, the pre-determined marker value is checked and then overwritten with a different value. Thus, when an unexpected failure occurs, the dedicated storage location does not contain the marker value, and the storage device thereby detects that a failure occurred.

If a failure is detected, then in block 542 the next directory entry among the directory entries 500 is selected. In one embodiment, block 542 involves serial polling of all the directory entries 500 in the storage devices 200, 202. Alternatively, block 542 involves selecting a directory entry based on a heuristic process, such as a least-recently-used (LRU) algorithm, probability, or statistics.

In block 544, all of the data associated with the current directory entry is deleted, for example, by overwriting the data with a pre-determined value. In block 552 the current directory entry is deleted, for example, by overwriting it. If necessary, the directory itself is deleted.

In block 554, a determination is made whether additional directory entries are in the directory information of the storage device. If so, the steps of blocks 542 and 552 are repeated for each additional directory entry.

In optional block 556, the other storage device is designated as the primary storage device of the storage unit. Such designation means that the storage unit continues to operate with read/write operations directed to the non-failing storage device. In this way, the storage unit remains operable, but a failed storage device within the storage unit is rendered unusable.

Once the data on the failed non-volatile storage devices 200 or 202 has been deleted, the device may be re-initialized. Once a determination has been made that the failed device has been successfully re-initialized, the data contained on the non-volatile storage devices 200 or 202 that did not fail can be copied onto the recovered non-volatile storage devices 200 or 202. In the event that the failed non-volatile storage devices 200 or 202 cannot be re-initialized successfully, the data from the non-volatile storage devices 200 or 202 that did not fail may be copied to a non-volatile storage device in another storage unit 106.

The use of redundant non-volatile storage devices 200, 202 provides significantly higher data reliability because it is extremely unlikely that both non-volatile storage devices 200 and 202 will fail at the same time. To provide further data reliability, other storage units 106, each including redundant non-volatile storage devices 200 and 202 may be employed to provide further redundancy.

Tamper Protection

According to an embodiment, storage units 106 are protected against unauthorized tampering. Sensors S1–S4 are monitored by processing unit 204 via link 208 to detect tampering with storage unit 106. The selection and placement of sensors S1–S4 is determined by the requirements of a particular application, but in general, is designed to detect unauthorized access to storage unit 106 through the breaking of seals, opening of sealed compartments, or other forceful entry into storage unit 106.

In the event that sensors S1–S4 detect unauthorized access to storage unit 106, a tamper signal is provided by sensors S1–S4 to processing unit 204. In response to the tamper signal, processing unit 204 deletes storage ID information 400, directory information 402 and data 404 in the manner previously described from non-volatile storage devices 200 and 202. This prevents the unauthorized use of data stored on storage unit 106.

Figure 5D:
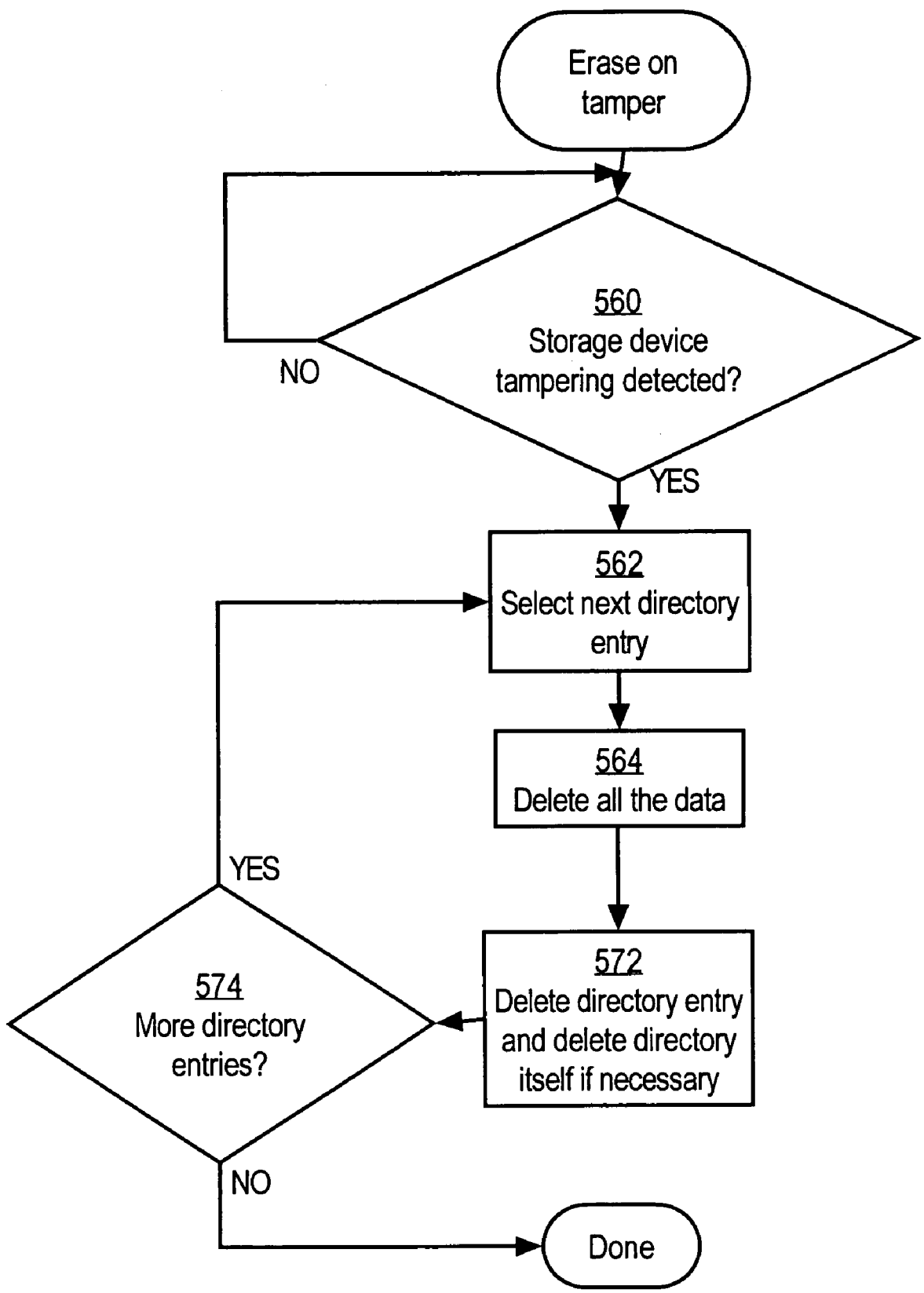
FIG. 5D is a flow diagram of an erase on tamper process.

FIG. 5D is a flow diagram of a preferred method of erasing a storage device in the event of tampering with the storage device. In block 560, a disturbance to a storage device, such as tampering with the storage device, invasion of the storage device, opening the storage device, etc., is detected. For example, block 560 may involve the steps of detecting that one or more of the sensors S1–S4 is activated or is generating a sensing signal.

If a tampering event is detected, then in block 562 the next directory entry among the directory entries 500 is selected. In one embodiment, block 562 involves serial polling of all the directory entries 500 in the storage devices 200, 202. Alternatively, block 562 involves selecting a directory entry based on a heuristic process, such as a least-recently-used (LRU) algorithm, probability, or statistics.

In block 564, all the data associated with the current directory entry is deleted, for example, by overwriting the data with a pre-determined value. In block 572 the current directory entry is deleted, for example, by overwriting it. If necessary, the directory itself is deleted.

In block 574, a determination is made whether additional directory entries are in the directory information of the storage device. If so, the steps of blocks 562 to 572 are repeated for each additional directory entry.

In one embodiment, block 562 or other blocks also involve the step of generating an alert to an authorized person to signify that tampering has occurred and the erase operations have been carried out. For example, in block 562 the processing unit 204 generates a message to a pre-determined station 102 that informs the station that tampering is detected and erasure is underway.

According to another embodiment, in the event of a power failure, backup power supplies 210 and 212 provide power for storage unit 106 including sensors S1–S4. However, non-volatile storage devices 200 and 202 operate in a power save mode. When operating in power save mode, normal write and read operations to non-volatile storage devices 200 and 202 are prohibited to conserve power. Once power has been restored, write and read operations to non-volatile storage devices 200 and 202 are continued. However, while storage unit 106 is operating in power save mode, if sensors S1–S4 detect unauthorized access to storage unit 106, all available power is used to delete storage ID information 400, directory information 402 and data 404 from non-volatile storage devices 200 and 202 as previously described. In this way, the erasure process cannot be circumvented merely by disconnecting power from a storage unit.

Storage Unit Registration

According to an embodiment, storage units 106 are registered with registration authority 110 to provide authentication of storage units 106. According to this approach, each storage unit 106 is registered with registration authority 110 by providing a unique storage unit identifier value to registration authority 110. In response, a registered identifier value is provided by registration authority 110 and stored in storage ID information 400 on non-volatile storage devices 200 and 202. Once a storage unit 106 is registered in this manner, a station 102 may verify that a particular storage unit 106 is registered with registration authority 110 by requesting the registered ID number from the particular storage unit 106 and then verifying with registration authority 110 that the registered Storage ID number is valid. This ensures that data contained on a particular storage unit 106 is original and authentic.

Figures 4B, 4C:
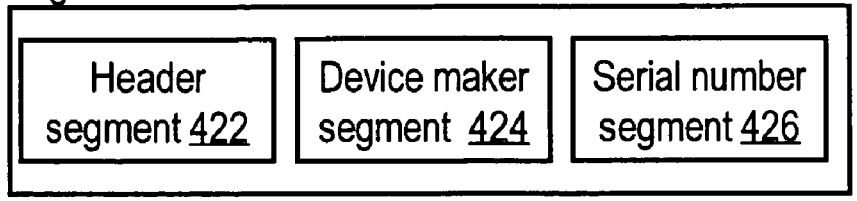
FIG. 4B is a diagram of a registered identifier value.
FIG. 4C is a diagram of a table of a registration authority database.

FIG. 4B is a diagram of a preferred embodiment of the registered identifier value 420 that comprises a header segment 422, a device maker segment 424, and a serial number segment 426.

The header segment 422 identifies the registration authority 110. For example, the header segment contains a pre-determined value that is uniquely associated, within the context of the storage unit or the OS, with the registration authority 110. The device maker segment 424 uniquely identifies the manufacturer or brand name of a storage unit. The device maker segment 424 may be a manufacturer name or a code number that uniquely identifies a particular manufacturer. The serial number segment 426 contains the serial number of the storage unit.

FIG. 4C is a diagram of the database 111. Preferably, the database 111 comprises at least one table 460 having one or more rows 462. Each row 462 corresponds to a storage unit 106. The table 460 has columns 464–468 that store manufacturer or brand name values, serial number values, and assignment date values. Each assignment date value identifies the date on which a row representing a storage device was added to the table 460.

Data Originality

In some circumstances, it may be desirable to preserve the originality and uniqueness of certain data stored on storage units 106 by not changing or deleting the certain data. In this way, the storage unit can "guarantee" to an external process or device that certain data is unaltered since it was originally written.

According to one embodiment, an audit trail is generated when data is copied from one device to another. As illustrated in FIG. 5A, each replication entry (R1, R2 . . . RN) specifies a date of replication 514 and source information including a storage ID 516 and a directory entry 512. In order to replicate data from a source device to a destination device, a replicate command is issued to the destination device with the specification of the source device along with the file information. The destination device then issues a special read command to the source device so that the data is encrypted to avoid modification of the data when transferred from the source device to the destination device.

Therefore, according to one embodiment, an approach is provided for ensuring that certain data stored on storage unit 106 is written only once and never changed, although the certain data may be read an unlimited number of times (read-only). The approach is data specific and does not require that all stored data be maintained as read-only data.

According to one embodiment, after read-only data is stored on non-volatile storage 200 and 202, the directory entry 500 associated with the read-only data is updated to reflect that the associated data is read-only data and is never to be overwritten or changed. The update acts as a declaration to other devices or processes that the stored data is unique and unchanged. For example, after read-only data has been written to non-volatile storage 200 and 202, other file management information 508 in the directory entry 500 associated with the read-only data is updated to reflect that the associated data is read only and is not to be changed. Thereafter when data is to be changed from non-volatile storage 200 and 202, the directory entry 500 associated with the data is examined to determine whether the particular data is read-only. If not, the associated data is changed as described herein. If so, then the associated data and directory entry 500 are not changed.

Another method of ensuring the originality is to limit write commands that can be executed on a particular device. For example, for situations where the files stored in a device are to be kept as authenticated data files to ensure the originality, the device may require a special status to write. Without the special write status, a write command fails when the same file name exists on a device.

This approach is applicable to any of the approaches described herein, include the erase after expiration, erase after tamper and erase after failure approaches discussed herein. This approach provides a way to immunize or guarantee the validity of stored data, so that the stored data is more reliable, for example, as legal evidence. The contents and uniqueness of the data are assured or guaranteed.

Computer System Overview

Figure 6:
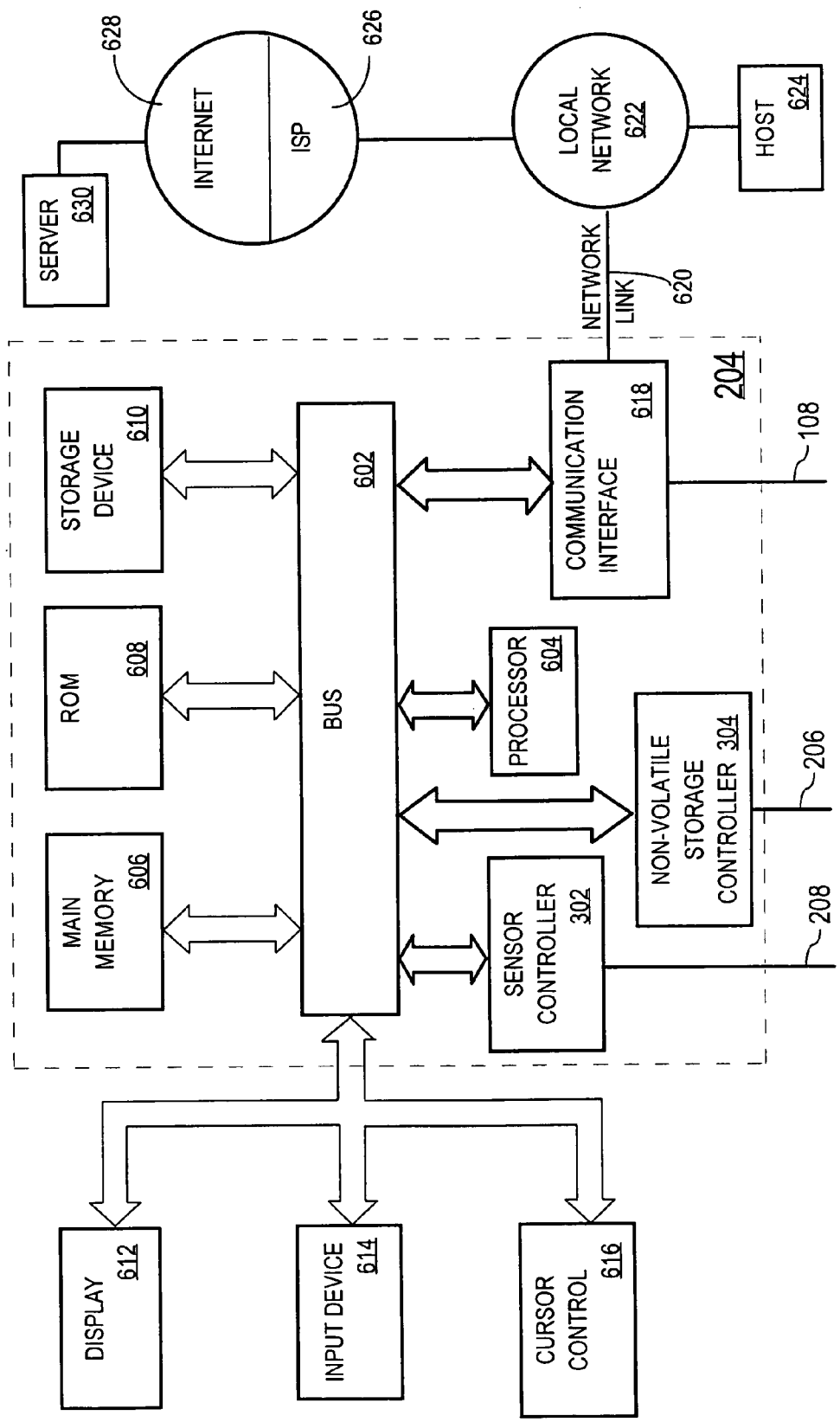
FIG. 6 is a block diagram of a computer system on which embodiments may be implemented.

FIG. 6 is a block diagram that illustrates a computer system that may be used to implement aspects of the invention; for example, an alternative embodiment of processing unit 204. Processing unit 204 includes a bus 602 or other communication mechanism for communicating information, and a processor 604 coupled with bus 602 for processing information. Processing unit 204 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Processing unit 204 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Processing unit 204 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of storage unit 106 for storing and maintaining data. According to one embodiment, the storing and maintaining of data is provided by processing unit 204 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments are not limited to any specific combination of hardware circuitry and software. The instructions may be organized as software agents, processes, subroutines, or programs.

The term "computer-readable medium" as used herein refers to any medium that participates in providing instructions to processor 604 for execution. Such a medium may take many forms, including but not limited to, non-volatile media, and volatile media. Non-volatile media includes, for example, optical or magnetic disks, such as storage device 610. Volatile media includes dynamic memory, such as main memory 606. A computer-readable medium may also take the form of transmission media. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to processing unit 204 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Processing unit 204 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from processing unit 204, are exemplary forms of carrier waves transporting the information.

Processing unit 204 can send messages and receive data, including program code, through the network(s), network link 620 and communication interface 618. In the Internet example, a server 630 might transmit a requested code for an application program through Internet 628, ISP 626, local network 622 and communication interface 618. One such downloaded application provides for storing and maintaining data as described herein.

The received code may be executed by processor 604 as it is received, and/or stored in storage device 610, or other non-volatile storage for later execution. In this manner, processing unit 204 may obtain application code in the form of a carrier wave.

The techniques described herein provide several advantages over prior approaches for storing and maintaining data. In particular, the approach of deleting data from storage unit 106 by overwriting the data with a predetermined value provides makes it more difficult to recover the data. The tamper monitoring provides further protection from unauthorized access to storage unit 106. The use of registration authority 110 to register storage units 106 authenticates the data stored on the registration authority 110. Finally, the approach for preserving the originality of data ensures that when certain data is read from storage unit 106 that the certain data was written once and has not been changed. Similarly, when data is deleted from storage unit 106, data designated as read-only data is not deleted from storage unit 106.

Alternatives and Variations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for storing and maintaining data, the computer-implemented method comprising:
   storing data on a first non-volatile storage device;
   storing directory data on the first non-volatile storage device, wherein the directory data includes an expiration date for the data;
   storing a copy of the data on a second non-volatile storage device;
   storing a copy of the directory data on a second non-volatile storage device;
   determining, based at least upon the expiration date contained in the directory data stored on the first non-volatile storage device, whether the data should be deleted from the first non-volatile storage device; and
   if the data should be deleted from the first non-volatile storage device, then
      deleting both the data and the directory data from the first non-volatile storage device, and
      deleting the copy of the data and the copy of the directory data from the second non-volatile storage device.

2. The computer-implemented method as recited in claim 1, wherein the directory data further includes a creation date of the data, a name of a data file containing the data and other file management information.

3. The computer-implemented method as recited in claim 1, further comprising updating the copy of the directory data to indicate the data as a source of the copy of the data.

4. The computer-implemented method as recited in claim 3, wherein updating the copy of the directory data to indicate the data as a source of the copy of the data includes updating the copy of the directory data to refer to the first non-volatile storage device and the directory data.

5. The computer-implemented method as recited in claim 4, further comprising updating the copy of the directory data to include a date at which the copy of the data was stored on the second non-volatile storage device.

6. The computer-implemented method as recited in claim 1, further comprising:
   if the data is not to be changed or deleted, then designating the data as read-only data;
   determining whether the data is read-only data; and
   wherein the step of if the data should be deleted from the first non-volatile storage device includes if the data is determined to not be read-only data and if the data should be deleted from the first non-volatile storage device, then deleting both the data and the directory data from the first non-volatile storage device.

7. A computer-readable storage medium for storing and maintaining data, the computer-readable storage medium carrying instructions which, when processed by one or more processors, cause:
   storing data on a first non-volatile storage device;
   storing directory data on the first non-volatile storage device, wherein the directory data includes an expiration date for the data;
   storing a copy of the data on a second non-volatile storage device;
   storing a copy of the directory data on a second non-volatile storage device;
   determining, based at least upon the expiration date contained in the directory data stored on the first non-volatile storage device, whether the data should be deleted from the first non-volatile storage device; and
   if the data should be deleted from the first non-volatile storage device, then
      deleting both the data and the directory data from the first non-volatile storage device, and
      deleting the copy of the data and the copy of the directory data from the second non-volatile storage device.

8. The computer-readable storage medium as recited in claim 7, wherein the directory data further includes a creation date of the data, a name of a data file containing the data and other file management information.

9. The computer-readable storage medium as recited in claim 7, further comprising one or more additional instructions which, when processed by the one or more processors, causes updating the copy of the directory data to indicate the data as a source of the copy of the data.

10. The computer-readable storage medium as recited in claim 9, wherein updating the copy of the directory data to indicate the data as a source of the copy of the data includes updating the copy of the directory data to refer to the first non-volatile storage device and the directory data.

11. The computer-readable storage medium as recited in claim 10, further comprising one or more additional instructions which, when processed by the one or more processors, causes updating the copy of the directory data to include a date at which the copy of the data was stored on the second non-volatile storage device.

12. The computer-readable storage medium as recited in claim 7, further comprising one or more additional instructions which, when processed by the one or more processors, causes:
   if the data is not to be changed or deleted, then designating the data as read-only data;
   determining whether the data is read-only data; and
   wherein the step of if the data should be deleted from the first non-volatile storage device includes if the data is determined to not be read-only data and if the data should be deleted from the first non-volatile storage device, then deleting both the data and the directory data from the first non-volatile storage device.

13. An apparatus for storing and maintaining data, the apparatus being configured to:
   store data on a first non-volatile storage device;
   store directory data on the first non-volatile storage device, wherein the directory data includes an expiration date for the data;
   store a copy of the data on a second non-volatile storage device;
   store a copy of the directory data on a second non-volatile storage device;
   determine, based at least upon the expiration date contained in the directory data stored on the first non-volatile storage device, whether the data should be deleted from the first non-volatile storage device; and
   if the data should be deleted from the first non-volatile storage device, then
      delete both the data and the directory data from the first non-volatile storage device, and
      delete the copy of the data and the copy of the directory data from the second non-volatile storage device.

14. The apparatus as recited in claim 13, wherein the directory data further includes a creation date of the data, a name of a data file containing the data and other file management information.

15. The apparatus as recited in claim 13, wherein the apparatus is further configured to update the copy of the directory data to indicate the data as a source of the copy of the data.

16. The apparatus as recited in claim 15, wherein updating the copy of the directory data to indicate the data as a source of the copy of the data includes updating the copy of the directory data to refer to the first non-volatile storage device and the directory data.

17. The apparatus as recited in claim 16, wherein the apparatus is further configured to update the copy of the directory data to include a date at which the copy of the data was stored on the second non-volatile storage device.

18. The apparatus as recited in claim 13, wherein the apparatus is further configured to:
   if the data is not to be changed or deleted, then designating the data as read-only data;
   determining whether the data is read-only data; and
   wherein the step of if the data should be deleted from the first non-volatile storage device includes if the data is determined to not be read-only data and if the data should be deleted from the first non-volatile storage device, then deleting both the data and the directory data from the first non-volatile storage device.

* * * * *